United States Patent [19]

Brubaker

[11] 4,095,307

[45] Jun. 20, 1978

[54] SCRAPER FOR A VESSEL INTERIOR SURFACE

[75] Inventor: Dale A. Brubaker, Delphi, Ind.

[73] Assignee: Lox Equipment Company, Livermore, Calif.

[21] Appl. No.: 700,730

[22] Filed: Jun. 28, 1976

[51] Int. Cl.² .................... B08B 9/08; F28Q 3/10
[52] U.S. Cl. .................... 15/246.5; 165/94; 366/311; 366/312
[58] Field of Search ............. 15/246.5, 104.1 C, 93 R, 15/93 A, 256.5, 256.51, 104.1 R, 104.14; 259/DIG. 32, DIG. 34, 107, 108, 109, 110; 23/285; 165/94; 62/354; 241/194; 432/151; 134/6, 8

[56] References Cited

U.S. PATENT DOCUMENTS

| 743,955 | 11/1903 | Thompson | 15/256.51 |
|---|---|---|---|
| 1,338,714 | 5/1920 | Wagner | 15/93 R |
| 2,884,234 | 4/1959 | Gebhart et al. | 15/246.5 X |
| 3,216,042 | 9/1965 | Strittmatter | 15/246.5 |
| 3,731,339 | 5/1973 | Addison | 15/246.5 |
| 3,848,289 | 11/1974 | Bachmann | 15/246.5 |
| 3,973,623 | 8/1976 | Sarll | 15/246.5 X |

FOREIGN PATENT DOCUMENTS

| 400,651 | 4/1974 | U.S.S.R. | 15/256.51 |

OTHER PUBLICATIONS

IBM Disclosure Bulletin (Berlier et al.), vol. 18, No. 6, Nov. 1975.

Primary Examiner—Edward L. Roberts
Attorney, Agent, or Firm—Bielen and Peterson

[57] ABSTRACT

A scraper for the interior surface of a vessel having an inner shaft positioned within the vessel. A plurality of arms are disposed radially with respect to the inner shaft in parallel pairs. At least two arms of one pair of arms oppositely radially disposed on the inner shaft are substantially parallel with respect to another two arms similarly disposed. Peripheral shafts span the end portions of the parallel arms. Further parallel arms and corresponding peripheral shafts may locate ninety degrees about the inner shaft with respect to adjacent pairs of arms. Scraping means for scraping the interior surface of the vessel mount to the plurality of peripheral shafts. The scraping means includes a lever having two pivotal arms, one pivotal arm encompassing a blade and the other pivotal arm having a spring means for urging contact between the blade and the inner surface of the vessel. The inner shaft may be constructed with sufficient flexibility to generally coincide with the deflected axis of imperfect vessels.

13 Claims, 10 Drawing Figures

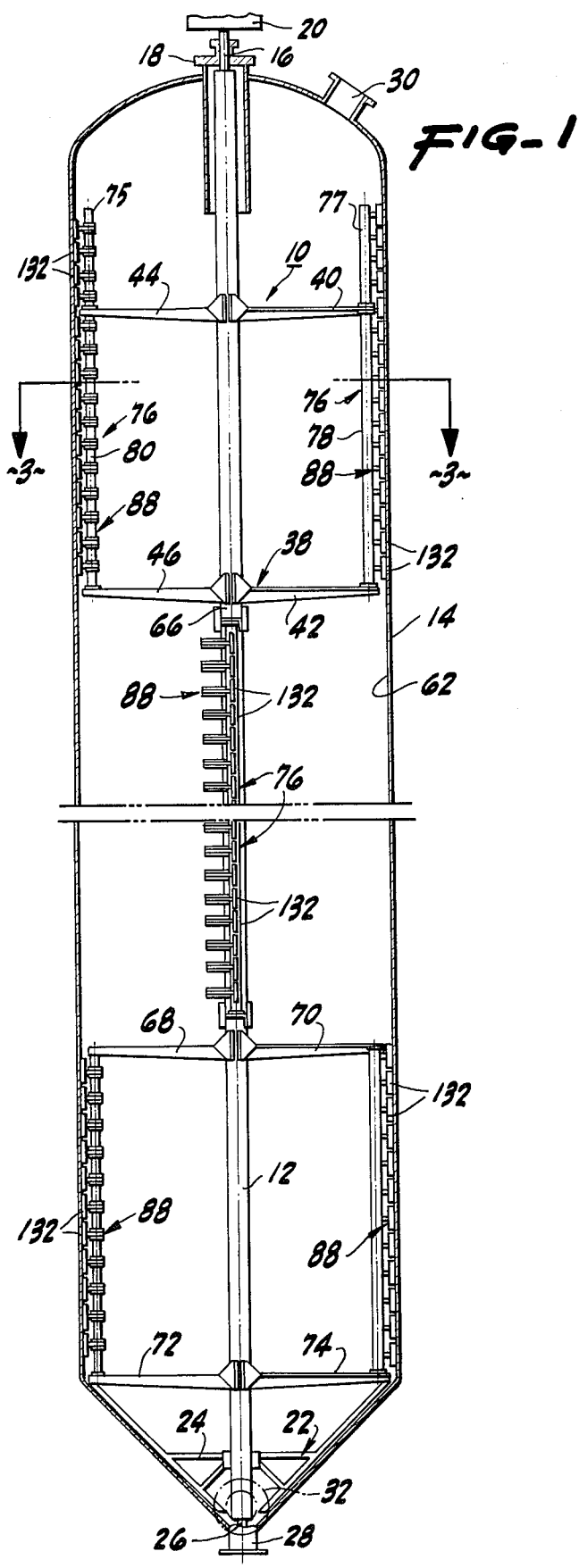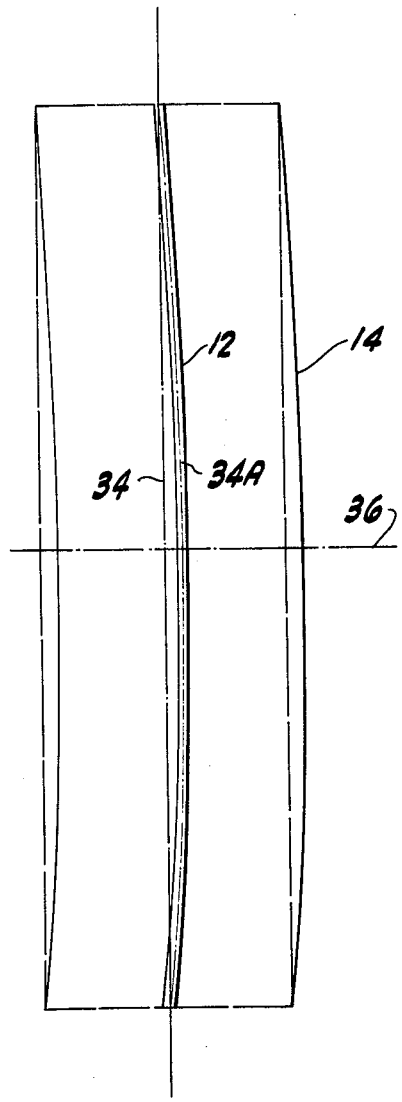
FIG-1
FIG-2

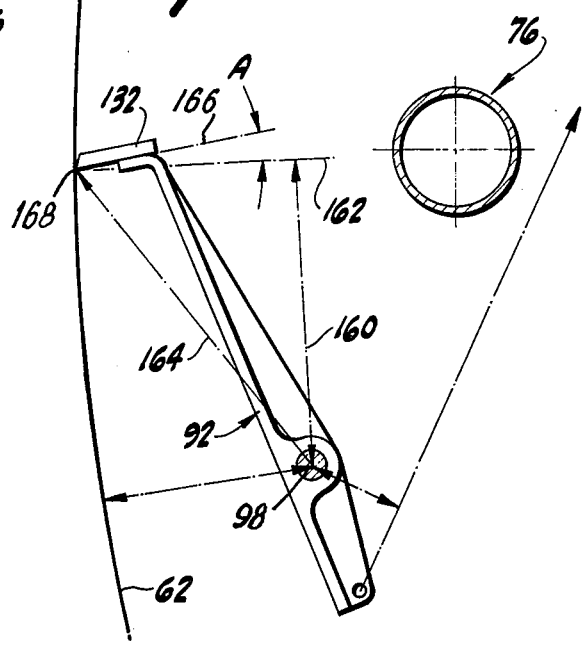
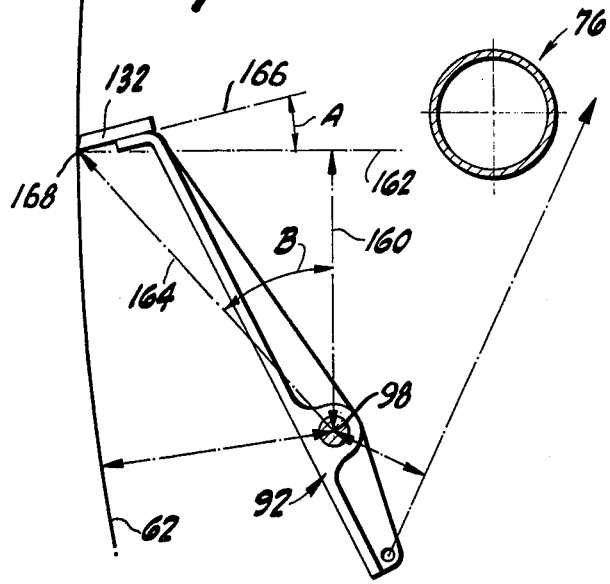
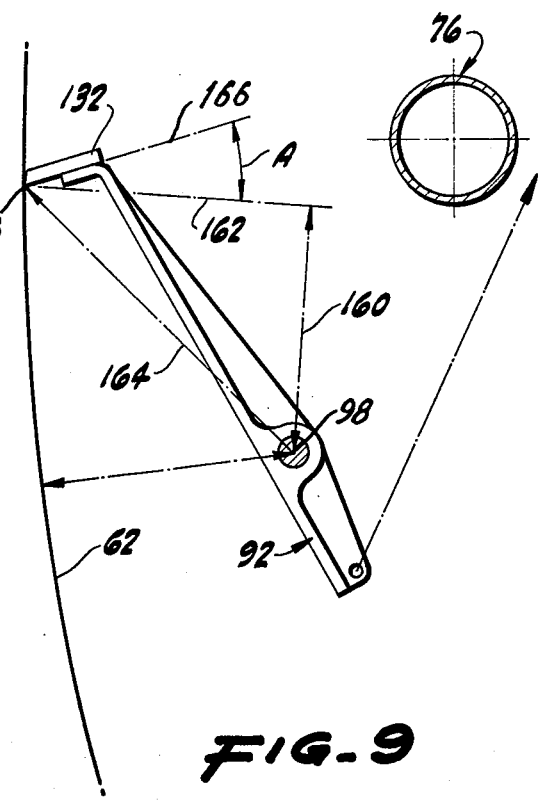
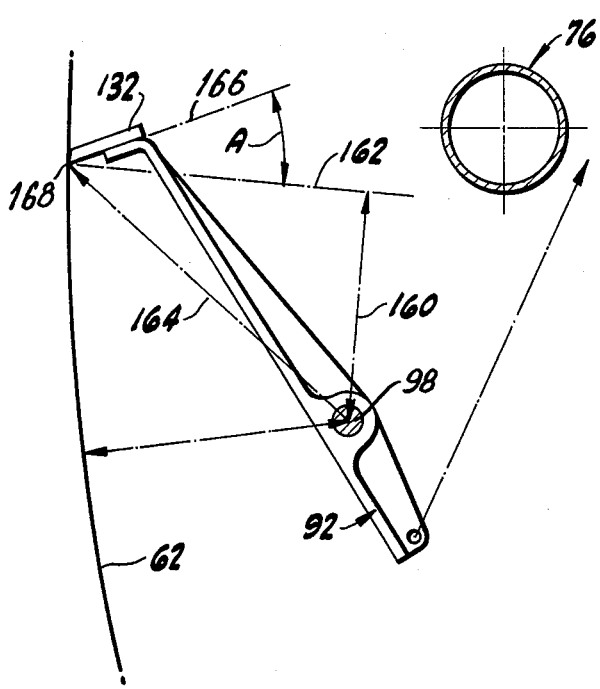

SCRAPER FOR A VESSEL INTERIOR SURFACE

BACKGROUND OF THE INVENTION

The present invention relates to a novel vessel scraper. The inner walls of vessels require cleaning for a variety of reasons. Often it is desired to maintain the vessel in a closed condition when such cleaning is necessary. Certain chemical operations utilize continuous scraping, for example, fractional crystallization.

Typical of such a process is the necessity of rapid and efficient heat exchange to freeze-out a particular solute from a solution. Crystallization on the inner surface of the crystallizer interferes with the cooling mechanism effecting such crystallization. Consequently, mechanical stirrers or scrapers have been employed on small scale crystallizers in the form of helical ribbons or spiral blades to keep the crystallization surface clean.

Large crystallizer vessels of cylindrical form are generally fabricated by welding plates together. The resultant vessel possesses an out-of-roundness and/or "banana" shape because of the nature of the fabrication. Accurate machining of large cylindrical vessels lends itself to the out-of-roundness problem, but this procedure is prohibitively expensive to accomplish. Prior scraper mechanisms have been rigidly constructed which has resulted in loss of efficiency requiring costly interruption of the crystallization process, for failure to accommodate construction imperfections or uneven build-up of crystallized materials.

SUMMARY OF THE INVENTION

In accordance with the present invention a novel scraper of the interior surfaces of vessels is provided. The scraper utilizes an inner shaft positioned with the vessel, preferably along the length of the vessel's large dimension. In the case of a cylindrical vessel, the inner shaft would extend approximately along its axis of length.

Attached to the inner shaft is a plurality of arms, radially disposed with respect to the inner shaft. The arms array to form at least a first and second pair of arms, the arms of each pair being opposedly positioned on the inner shaft in relation to one another. The first and second pairs of arms positioned such that the arms of the first pair are substantially parallel to the arms of the second pair.

A plurality of peripheral shafts span the end portions of the plurality of arms, with at least a pair of peripheral shafts spanning the first and second pairs of substantially parallel arms.

Scraping means for scraping the interior surface of the vessel of crystallized material mounts on the peripheral shafts. Specifically, the scraping means includes a plurality of scraping units, each having a lever arrangement. The lever includes a first pivotal arm and a second pivotal arm rotating or pivoting about a fulcrum. The first pivotal arm of the lever includes a blade contacting the inner surface of the vessel. The second pivotal arm of the lever connects to spring means which urges contact between the blade and the inner surface of the vessel. The irregularities of the vessel and the inner surface of the vessel may cause the fulcrum of the lever to vary its distance with respect to the inner surface of the vessel. The blade continually contacts the inner surface of the vessel.

Rotational means turns the inner shaft, which may be flexible enough to coincide with a vessel having a deflected axis. The scraping means will adjustably move with respect to the vessel wall and maintain its scraping action during rotation of the inner shaft. The scraping means preferably operates within a certain angular configuration; i.e., an acute angle formed between a line perpendicular to the normal force vector of the blade contacting the inner surface of the vessel, the fulcrum of the lever as an apex and a line to the blade's point of contact with the vessel's inner surface.

The scraping means may be fully adjustable and include a removable pin to retain the pivotal arm from rotational movement about the fulcrum. This feature permits easy manipulation during installation and removal of the scraping units while cocked.

Further pairs of substantially parallel arms may be included attached to the inner shaft. Each duality of pairs of arms may be staggered at right angles with respect to adjacent dualities of pairs of arms along the axis of the inner shaft. In this manner, the entire inner surface of the vessel's interior receives the cleaning or scraping action of the scraper.

It is therefore an object of the present invention to provide a scraper for the interior surface of a vessel capable of uniformally removing build-up therefrom.

It is another object of the present invention to provide a scraper for the interior surface of a vessel adaptable to any irregularities in the vessel's inner surfaces as well as imperfections in the vessel's shape.

Another object of the present invention is to provide a scraper for the interior surface of a vessel having an extremely long life between repair periods and being efficiently workable while the scraping blade wears.

Another object of the present invention is to provide a scraper useable with a crystallizer which performs a removal of crystallized material during fractional crystallization operations without damage to the inner surface of the crystallizer's inner wall.

Yet another object of the present invention is to provide nearly uniform scraping force to remove solids from the interior of vessels.

Still another object of the present invention is to provide a scraper usable with a separator for fractional crystallization operations.

The invention possesses other object and advantages especially as concerns particular features and characteristics thereof which will become apparent as the specification continues.

The invention and its embodiments may be better understood by reference to the accompanying drawings described hereinafter.

BRIEF DESCRIPTION OF THE DRAWINGS

FIG. 1 is a sectional view of a vessel containing the present invention.

FIG. 2 is a schematic view of an imperfect vessel.

FIG. 7 is a top plan view of a portion of the invention's operational mode.

FIG. 8 is a top plan view of a portion of the invention's operational mode.

FIG. 9 is a top plan view of a portion of the invention's operational mode.

FIG. 10 is a top plan view of a portion of the invention's operational mode.

DESCRIPTION OF THE PREFERRED EMBODIMENTS

Figure 3:
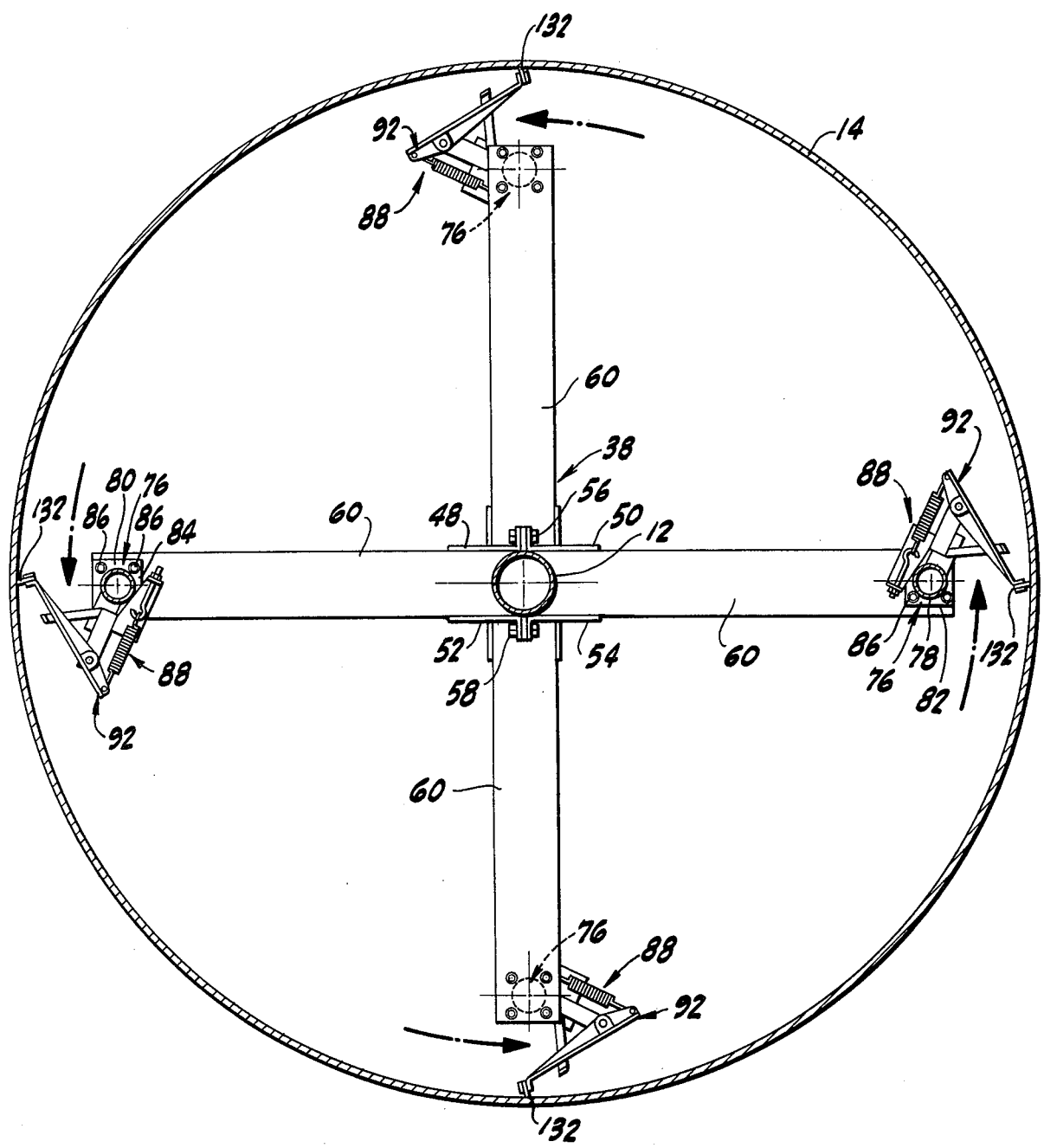
FIG. 3 is a view taken along line 3—3 of FIG. 2.

The invention in its entirety is depicted in the drawings by reference character 10 and includes, FIG. 1, an inner shaft 12 positioned within a vessel 14. The shaft 12 may be constructed of any resilient material. It has been found for a vessel 14 having a diameter of approximately 3.65 meters that a stainless steel pipe approximately 20 centimeters in diameter is sufficient. The upper ends of shaft 12 connects to an axle 16 through stuffing box 18. Rotational means 20 turns the inner shaft 12 at the desired rate. The opposite lower end of shaft 12 includes end breaker 22 supported by struts 24 which affix to and turn with shaft 12. Axle 26 sits in base bearing 28 (Partially broken).

Vessel 14 includes upper inlet 30 and lower outlet 32 in the case of a fractional crystallization process, batch or continuous. Recovery of solids from the mother liquor may take place after passage of the constituents through outlet 32 or in the lower portion of the vessel, via centrifuging, decanting or other known processes, not shown. Vessel 14 typically has a polished inner surface 62.

Construction of vessel 14 from plates pieced together by welding often results in an imperfectly shaped vessel. In the case of a generally cylindrically formed vessel a "banana" shape or even slight "S" shape, often occurs. For example, in FIG. 2, a vessel approximately 10 meters in length may have deflected axis 34A approximately 0.4 to 0.8 centimeters from the central plane 36. A regular vessel is shown for comparison on FIG. 2. Since plate welding is a most practical method of constructing such vessels, the scraper of the present invention designedly accommodates such imperfections, as will be described as the specification continues.

Shaft 12 includes a plurality of arms 38 radially disposed with respect to the inner shaft 12 and affixed thereto. The invention in one embodiment includes a first pair of substantially parallel arms 40, 42 and a second pair of substantially parallel arms 44, 46. FIG. 3 depicts a fastening means of arms 42 and 46 using flanges 48 and 50 and 52 and 54 and threaded fasteners 56 and 58. Flanges 48, 50, 52, and 56 may be welded to arms 46 and 42 respectively. Arms 42 and 46 thus are oppositely radially disposed along shaft 12. Likewise, arms 44 and 40 oppose one another on shaft 12. Arms 38 may be identically constructed and include a plurality of flat surfaces 60 which offer excellent footing for working personnel within vessel 14. Arms 38 generally possess rigidity in a centrifugal direction. The invention may further be deemed to include a plurality of pairs of arms 40, 42 and 44, 46, for instance, arm pairs 64, 66 FIG. 3, and parallel counter parts (not shown) and arm pairs 68, 70 and 72, 74. As shown in FIG. 1, adjacent arms pairs may be staggered at right angles along the shaft 12.

A plurality of peripheral shafts 76 span the end portions of at least arm pairs 40, 42 and 44, 46. In particular, shafts 78 and 80 affix to the end portions of arm pairs 40, 42 and 44, 46, respectively by exemplified flanges 82 and 84, FIG. 3, and fasteners 86. Flanges of the type shown by flanges 82 and 84 are used on either end of the plurality of shafts 76 to connect pairs of parallel arms 38 such as 40, 42 and 44 and 46. Generally, peripheral shafts 76 should be of rigid construction.

The invention also includes scraping means 88 for scraping or cleaning the interior surface 62 of vessel 14, FIGS. 1 and 3, mounted on the plurality of peripheral shafts 76. It should be noted that end shafts 75 and 77 have scraping means 88 mounted thereupon. End shafts 75 and 77 are cantileveredly fixed to arms 44 and 40 respectively, the end pair of the plurality of arms 38. The scraping units 90, FIG. 4, including a lever 92 having a first pivoted arm 94 and a second pivotal arm 96 about fulcrum 98. Fulcrum 98, as illustrated, comprises a pin 100 within boss 102 restricted from vertical movement by cotter pin 104. Boss 102 fixes to bracket 106 having openings 108 therethrough, FIG. 5. Bracket 110 connects to peripheral shaft 76 by any suitable means such as welding spots 112. Bracket 110 includes identical openings to bracket 106 openings 108. The distance between fulcrum 98 and the axis peripheral shaft 76 is predetermined to also fix the distance between fulcrum 98 and the inner surface 62 of vessel 14. Fasteners 114 rigidly connect brackets 106 and 110, FIG. 6.

Figure 4:
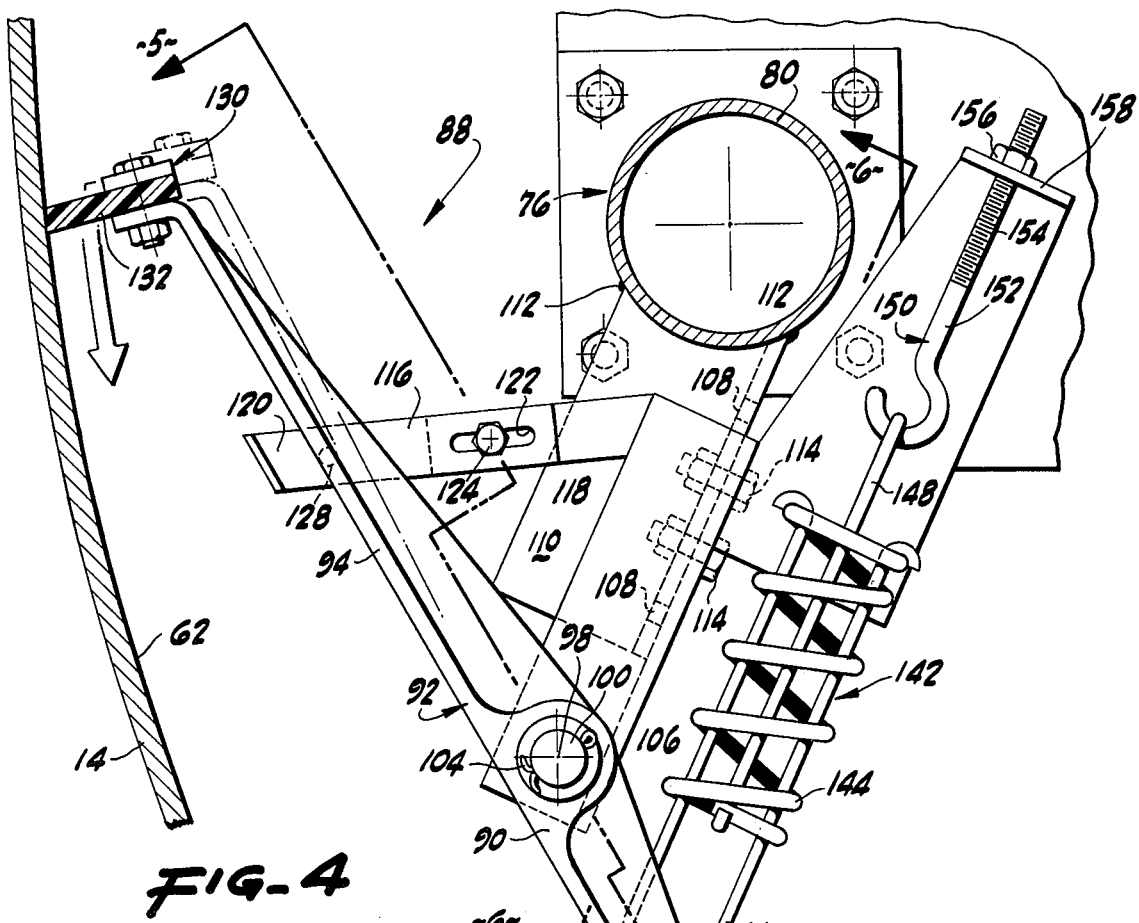
FIG. 4 is a partially broken top plan view of the scraping unit.
Figure 5:
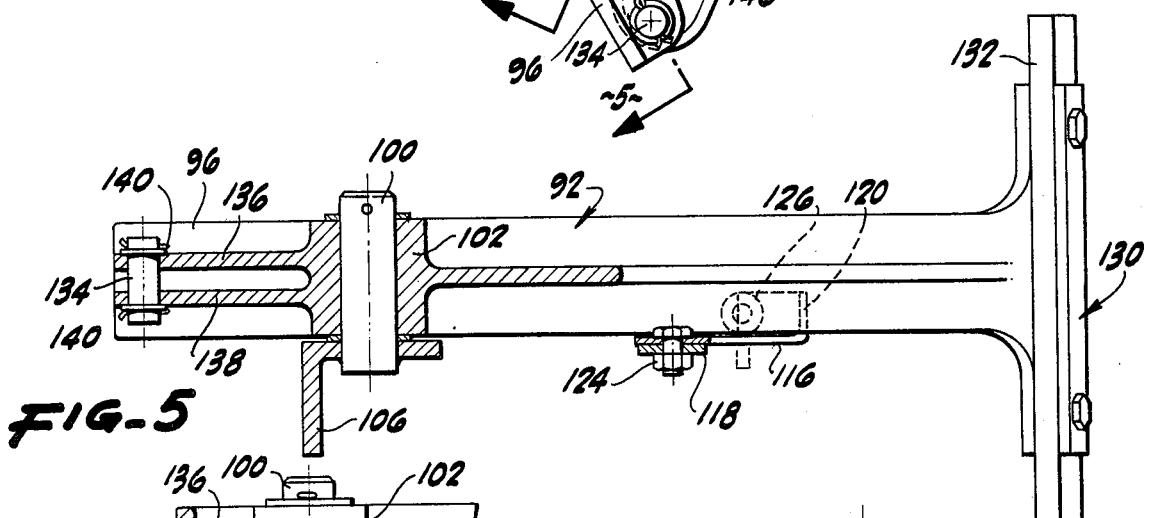
FIG. 5 is a view taken along line 5—5 of FIG. 4.
Figure 6:
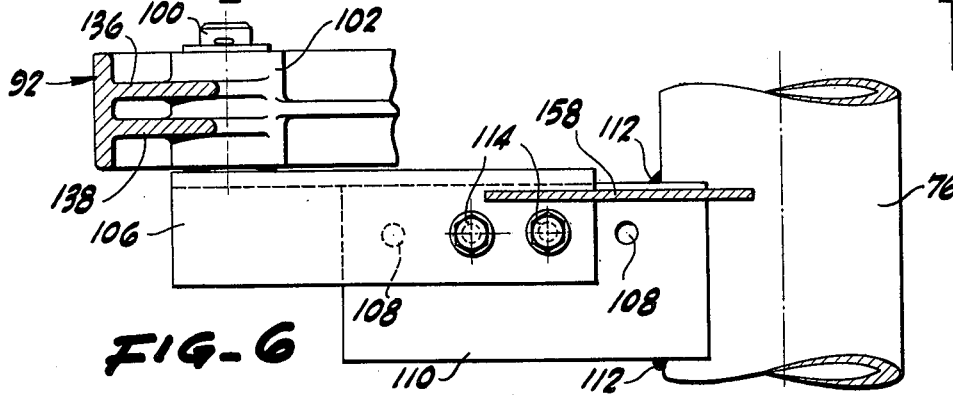
FIG. 6 is a view taken along line 6—6 of FIG. 4.

FIGS. 4 and 5 show retainer 116 which may take the form of an "L" shaped member having two sections 118 and 120. Slot 122 and removable fastener 124 allow adjustment of the length of retainer 116. First pivotal arm 94 swings only as far as the end of retainer 116. The swing of first pivotal arm 94 may be further restricted by pin 126 fitted into opening 128, during installation and like manipulations thereof.

First pivotal arm 94 terminates at one end in a clamp 130 which holds blade 132, which may be constructed of material not damaging to the polished inner surface 62 such as nylon, wood, and the like. The first pivotal arm 94 and clamp 130 may be made of material softer than inner surface 62, for example, if vessel 14 were constructed of stainless steel, arm 94 and clamp 130 might be constructed of bronze.

The second pivotal arm 96 of lever 92 has a pin 134 positioned between wings 136 and 138 employing cotter pin 140. Spring means 142 connects to the second pivotal arm 96 thus urging contact between blade 132 and inner surface 62 of vessel 14. Spring means may take the form shown in FIG. 4, which utilizes the compression forces of coil spring 144. Surrounding mounting member 146 hooks to pin 134. Hook 148 links the end of spring 144 with hook 150 having an adjustable portion 152 consisting of a threaded end 154, nut 156, and plate 158, integral with bracket 106. Scraping unit 90 may be preset such that blade 132 has an attack angle A of between 10 and 25 degrees with respect to inner surface 62 (Angle A being defined between line 162 normal to surface 62 and line 166 parallel to the plane of blade 132). The variation in angular contact between blade 132 and inner surface 62 of vessel 14 produces a relatively small variation in blade force against inner surface 62. It has been found that the proper loading of spring means at about 23 kilograms will produce a variation of approximately one kilogram in blade force when angle B is acute (Angle B being defined between line 160, perpendicular to line 162 and passing through fulcrum 98, and line 164 passing through fulcrum 98 and point of contact 168 of blade 132). Desirably, a working range from 30° to 80° for angle B has been discovered to more accurately control the blade force. It may be deduced that the increase in blade angle A also decreases the length of line 160, the moment arm of the blade, which produces an offset, thus the blade force against inner surface 62 remains nearly constant through the changes in attack angles A. The angle A shown on FIGS. 7 through 9 range from 10° to 24° and the calculated force of blade 132 against inner surface 62 ranges between 7.9 kilograms and 8.6 kilograms.

Likewise, the scraping force variation may be further modulated by constructing inner shaft 12 such that it generally coincides with the deflected axis 34 of vessel 14 during rotation of shaft 12 by rotational means 20.

More specifically, shaft 12 may possess rigidity according to the following equation:

$$EI = FL^3/K\Delta R$$

Where E is the modulus of elasticity of shaft 12, I is the moment of inertia of shaft 12, F is the total blade force on surface 14, $\Delta R$ is the deflection of the vessel axis, and L is the length of the inner shaft 12 and K, a constant, ranges between 10 and 400.

In operation, after presetting spring means 142 and inserting pin 126, the scraper 10 is placed within vessel 14. Pin 126 is removed from each scraping unit 90. The vessel may be sealed if desired. Scraped material may be gathered after passage through outlet 32. When the inner surface 62 of vessel 14 requires cleaning the rotational means 20 activates. Shaft 12, plurality of arms 38, and scraping means 88 mounted on plurality of peripheral shafts 76 rotate.

Any variations in blade force will be absorbed by scraping units 90 as well as the flexibility of shaft 12 during operation of scraper 10.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. Scraper for the interior surface of a vessel comprising:
   a. an inner shaft positioned within the vessel,
   b. a plurality of arms radially disposed with respect to said inner shaft said plurality of arms having at least a first pair of substantially parallel arms and a second pair of substantially parallel arms, one of said arms of said first pair of arms oppositely radially disposed along said inner shaft with respect to one arm of said second pair of arms and another of said arms of said first pair of arms oppositely radially disposed along said shaft with respect to another arm of said second pair of arms,
   c. a plurality of peripheral shafts spanning the end portions of at least said first and second pairs of substantially parallel arms,
   d. scraping means for scraping the interior surface of the vessel mounted on said plurality of peripheral shafts, said scraping means comprising a plurality of scraping units, each of said units including a lever having a first pivotal arm and a second pivotal arm pivotal about a fulcrum and having a blade contacting the inner surface of the vessel, said blade mounted on said first pivotal arm of said lever, said second pivotal arm of said lever connected to spring means for urging contact between said blade and the inner surface of the vessel through a predetermined range of distances between the fulcrum of said lever and the inner surface of the vessel.

2. The scraper of claim 1 in which the vessel is elongated having a deflected axis and said inner shaft is flexible to generally coincide with the axis of the vessel when said rotational means turns said inner shaft.

3. The scraper of claim 2 in which said inner shaft possesses rigidity according to the following equation:

$$EI = FL^3/K\Delta R$$

wherein E is the modulus of elasticity of said shaft, I is the moment of inertia of said shaft, F is the total blade force on the interior surface, a deflection $\Delta R$ of the vessel axis, L is the length of said inner shaft and K, a constant, ranges between 10 and 400.

4. The scraper of claim 2 in which each of said scraping units forms an acute angle utilizing said fulcrum as an apex connecting a line perpendicular to the normal force vector of said blade contacting said inner surface of said vessel and connecting a line to the point of contact of said blade and the inner surface of said vessel.

5. The scraper of claim 4 in which said acute angle ranges between 30° and 80°.

6. The scraper of claim 5 in which said scraping means further comprises a removable pin which retains said first pivotal arm from rotational movement about said fulcrum.

7. The scraper of claim 1 in which said plurality of arms includes a plurality of first and second pairs of substantially parallel arms, each of first and second pairs of said substantially parallel arms being angularly staggered with respect to adjacent first and second pairs of substantially parallel arms along the axis of said inner shaft.

8. The scraper of claim 7 which further includes an end pair of peripheral shafts having said scraping means mounted thereupon, said end pair of peripheral shafts cantileveredly fixed to the end pair of said plurality of said first and second pairs of arms.

9. The scraper of claim 7 in which said scraping means includes a plurality of scraping units, each of said units including a lever having a first pivotal arm and a second pivotal arm about a fulcrum and having a blade contacting the inner surface of the vessel, said blade mounted on said first pivotal arm of said lever, said second pivotal arm of said lever connected to spring means for urging contact between said blade and the inner surface of the vessel through a predetermined range of distances between the fulcrum of said lever and the inner surface of the vessel.

10. The scraper of claim 9 in which the vessel is elongated having a deflected axis and said inner shaft is flexible to generally coicide with the axis of the vessel when said rotational means turns said inner shaft.

11. The scraper of claim 10 in which said inner shaft possesses rigidity according to the following equation:

$$EI = FL^3/K\Delta R$$

wherein E is the modulus of elasticity of said shaft, I is the moment of inertia of said shaft, F is the total blade force on the interior surface, a deflection $\Delta R$ of the vessel axis, L is the length of said inner shaft and K, a constant, ranges between 10 and 400.

12. The scraper of claim 10 in which each of said scraping units forms an acute angle utilizing said fulcrum as an apex connecting a line perpendicular to the normal force vector of said blade contacting said inner surface of said vessel and connecting a line to the point of contact of said blade and the inner surface of said vessel.

13. The scraper of claim 12 in which said scraping means further comprises a removable pin which retains said first pivotal arm form rotational movement about said fulcrum.

* * * * *